United States Patent
Lu

(10) Patent No.: US 9,628,397 B2
(45) Date of Patent: Apr. 18, 2017

(54) COMMUNICATION DEVICE AND RELATED PACKET PROCESSING METHOD

(75) Inventor: Kuo-Cheng Lu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 1029 days.

(21) Appl. No.: 13/447,303

(22) Filed: Apr. 16, 2012

(65) Prior Publication Data

US 2013/0272311 A1    Oct. 17, 2013

(51) Int. Cl.
*H04L 12/891* (2013.01)
*H04L 12/863* (2013.01)

(52) U.S. Cl.
CPC .......... *H04L 47/41* (2013.01); *H04L 47/624* (2013.01)

(58) Field of Classification Search
None
See application file for complete search history.

(56) References Cited

U.S. PATENT DOCUMENTS

| | | | |
|---|---|---|---|
| 6,804,692 B2 | 10/2004 | Davidson | |
| 6,895,011 B1 * | 5/2005 | Lassers | 370/394 |
| 7,085,274 B1 * | 8/2006 | Rahim et al. | 370/394 |
| 7,477,644 B2 * | 1/2009 | Georgiou et al. | 370/394 |
| 7,580,411 B2 | 8/2009 | Wen | |
| 2012/0082096 A1 * | 4/2012 | Cave et al. | 370/328 |

FOREIGN PATENT DOCUMENTS

TW    I358931    2/2012

* cited by examiner

*Primary Examiner* — Hassan Phillips
*Assistant Examiner* — Saba Tsegaye
(74) *Attorney, Agent, or Firm* — Winston Hsu; Scott Margo

(57) ABSTRACT

The present invention discloses a communication device, including a first network interface, for receiving a plurality of packets composed of a plurality of first packets destined to a first communication device and a plurality of second packets, a first reordering engine, for reordering the plurality of first packets, outputting the plurality of reordered first packets, and outputting the plurality of second packets, a second reordering engine, for receiving the plurality of second packets from the first reordering engine, and reordering the plurality of second packets, a second network interface, for receiving the plurality of reordered first packets from the first reordering engine, and transmitting the plurality of reordered first packets to the first communication device, and a processing module, for processing the plurality of reordered second packets.

18 Claims, 5 Drawing Sheets

COMMUNICATION DEVICE AND RELATED PACKET PROCESSING METHOD

BACKGROUND OF THE INVENTION

1. Field of the Invention

The present invention relates to a communication device and related packet processing method, and more particularly, to a communication device and related packet processing method for accelerating packet processing speed.

2. Description of the Prior Art

Link aggregation, link bundling, Ethernet/network/NIC bonding, or NIC teaming are computer networking umbrella terms to describe various methods of combining (aggregating) multiple network connections in parallel to increase throughput beyond what a single connection could sustain, and to provide redundancy in case one of the links fails. Aggregation can be implemented at any of the lowest three layers of the OSI model. Examples of aggregation at layer 1 are power line (e.g. IEEE 1901) and wireless (e.g. IEEE 802.11) network devices that combine multiple frequency bands into a single wider one. Layer 2 (data link layer, e.g. Ethernet frame in LANs or multi-link Point-to-Point Protocol in WANs) aggregation typically occurs across switch ports, which can be either physical ports, or virtual ones managed by an operating system. Aggregation is also possible at layer 3 in the OSI model, i.e. at the network layer (e.g. Internet Protocol or Internetwork Packet Exchange), using round-robin scheduling, or based on hash values computed from fields in the packet header, or a combination of these two methods. Regardless of the layer on which aggregation occurs, the network load is balanced across all links. Most methods provide failover/redundancy as well.

Taking the Wireless Local Area Network for example, frame aggregation is a feature of the IEEE 802.11e and 802.11n WLAN standards that increases throughput by sending two or more data frames within a single transmission. Every frame transmitted by an 802.11 device has a significant amount of overhead, including radio level headers, Media Access Control (MAC) frame fields, interframe spacing, and acknowledgment of transmitted frames. At the highest data rates, the overhead can consume more bandwidth than the payload data frame. To address this issue, the 802.11n standard defines two types of frame aggregation: MAC Service Data Unit (MSDU) aggregation and MAC Protocol Data Unit (MPDU) aggregation. Both types group several data frames into one large frame. Because management information needs to be specified only once per frame, the ratio of payload data to the total volume of data is higher, which achieves higher throughput.

In the Aggregated MAC Service Data Unit (A-MSDU) scenario, multiple Ethernet packets with the same destination and quality of Service (QoS) profile will be conjoined together and sent when a transmitter gets access to a medium. However, the trouble is if it comes to a noisy channel, there is a higher chance of a collision, and the A-MSDU has only one Cyclic Redundancy Check (CRC) or checksum; therefore, the transmitter has to retransmit the whole aggregated packet again.

On the other hand, in the Aggregated MAC Protocol Data Unit (A-MPDU) scenario, a transmitter end conjoins packets as 802.11 packets, which means if there is a collision, the individual packet can be retransmitted since the A-MPDU have individual MAC headers and CRC's corresponding to each packet, and each packet is allowed to be individually acknowledged as well. In such a situation, packet reordering is required in the receiver end since some packets may be lost due to the interference of the media and would be retransmitted again by the transmitter end.

Moreover, sliding window protocol is a feature of packet-based data transmission protocols, the sliding window protocol is used where reliable in-order delivery of packets is required, such as in the Data Link Layer (OSI model) as well as in the Transmission Control Protocol (TCP). Conceptually, each sub-packet of the transmission is assigned a unique consecutive sequence number, and the receiver uses the numbers to place received packets in the correct order, discarding duplicate packets and identifying missing ones.

Please refer to FIG. 1, which is a schematic diagram illustrating packets transmission in a communication network 10. In FIG. 1, communication devices S, A and B transmit and receive packets based on the A-MPDU and the sliding window protocol in the communication network 10. The communication devices S, A and B may be identical or different communication devices with a wired or a wireless communication function, such as a server, an access point or a personal computer. In detail, the communication device S serves as a packet source for aggregating two packet streams $P_A$ and $P_B$ respectively destined to the communication devices A and B into aggregated packets $P_{AB}$, and transmitting the aggregated packets $P_{AB}$ to the communication device B. Each sub-packet of the aggregated packets $P_{AB}$ is assigned a unique consecutive number, e.g. 0, 1, 2 and so on. The communication device B serves as a receiver as well as a bridge for extracting the packets $P_B$ from the aggregated packets $P_{AB}$, and passing the packets $P_A$ to the communication device A. The communication device A serves as a receiver for simplicity.

Traditionally, the communication device B receives the aggregated packets $P_{AB}$ via a network interface 12, and a Direct Memory Access (DMA) 14 transfers the received aggregated packets $P_{AB}$ from the network interface 12 to a processing module 11. The processing module 11 unwraps the ordered aggregated packet stream $P_{AB}$, performs reordering on the aggregated packets $P_{AB}$, extracts the packets $P_B$ for further processing, aggregates the packets $P_A$ and numbers the aggregated packets $P_A$ with new sequence numbers. Then, a DMA 15 transfers the aggregated packets $P_A$ to a network interface 13 to transmit the aggregated packets $P_A$ to the communication device A accordingly.

As can be seen, operations of processing the packets $P_{AB}$, $P_A$, $P_B$ are mainly handled by the processing module 11, which leads to heavy operating activities and high power consumption of the processing module 11. Besides, the communication device B is a bridge for passing the packets $P_A$ while wasting resources on handling the packets $P_A$, which also reduces a processing efficiency of the processing module 11. As a result, there is a need to improve the prior art to reach better processing efficiency of the processing module and shorten the time for passing the packets.

SUMMARY OF THE INVENTION

It is therefore an object of the present invention to provide a communication device and related packet processing method for accelerating packet processing speed.

The present invention discloses a communication device, including a first network interface, for receiving a plurality of packets composed of a plurality of first packets destined to a first communication device and a plurality of second packets, a first reordering engine, for reordering the plurality of first packets, outputting the plurality of reordered first packets, and outputting the plurality of second packets, a second reordering engine, for receiving the plurality of second packets from the first reordering engine, and reordering the plurality of second packets, a second network interface, for receiving the plurality of reordered first packets from the first reordering engine, and transmitting the plurality of reordered first packets to the first communication device, and a processing module, for processing the plurality of reordered second packets.

The present invention further discloses a packet processing method for a communication device, including receiving a plurality of packets composed of a plurality of first packets destined to a first communication device and a plurality of second packets, reordering the plurality of first packets, outputting the plurality of reordered first packets, and outputting the plurality of second packets, receiving the plurality of second packets from the first reordering engine, and reordering the plurality of second packets, receiving the plurality of reordered first packets from the first reordering engine, and transmitting the plurality of reordered first packets to the first communication device, and processing the plurality of reordered second packets.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a communication device including a reordering engine to offload an overhead of the communication device processing the received packets to improve a processing efficiency of the communication device.

Figure 1:
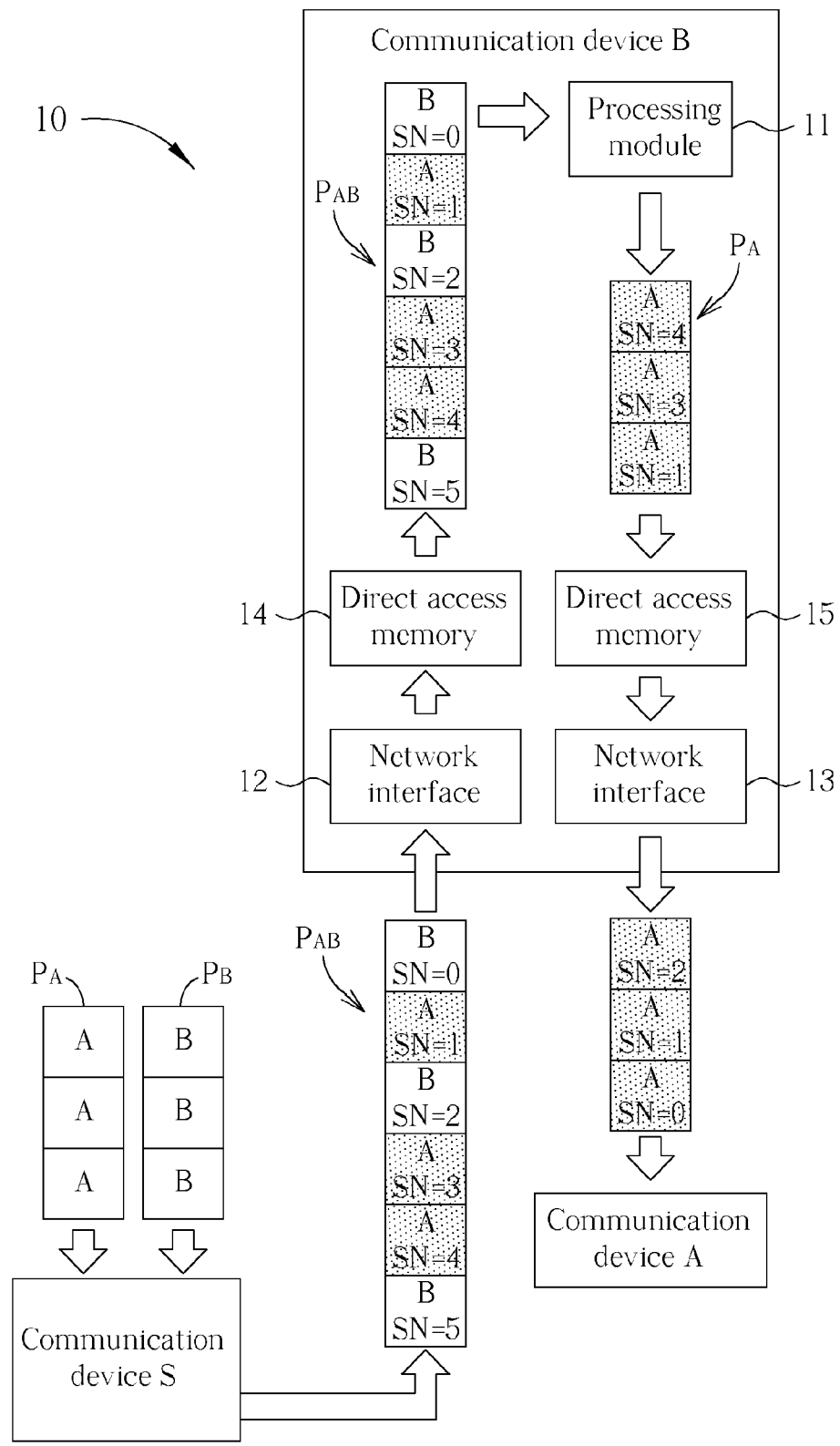
FIG. 1 is a schematic diagram illustrating packets transmission in a communication network.
Figure 2:
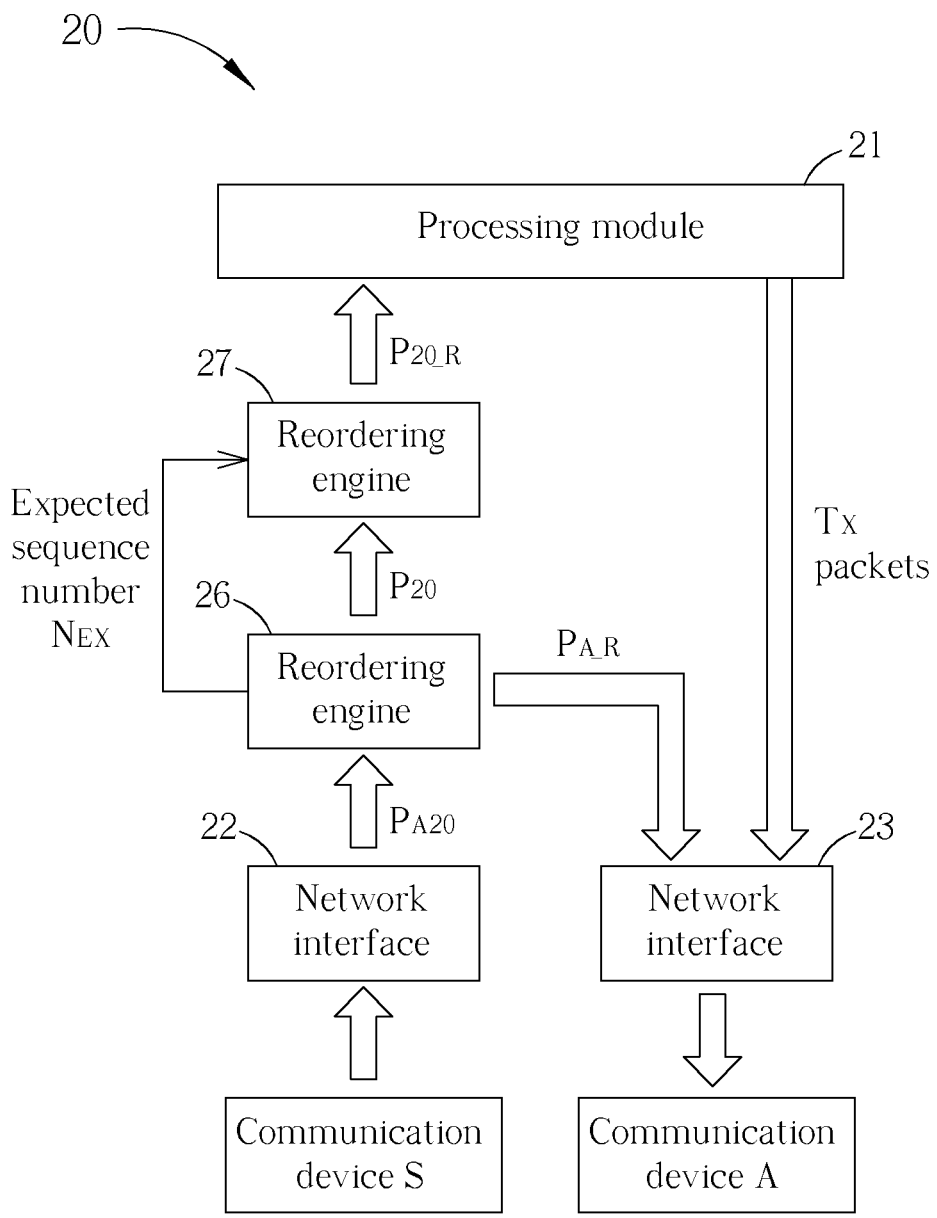
FIG. 2 is a functional block diagram of a communication device according to an embodiment of the present invention.

Please refer to FIG. 2, which is a functional block diagram of a communication device 20 according to an embodiment of the present invention. The communication device 20 is simply composed of a processing module 21, network interfaces 22 and 23, and reordering engines 26 and 27. The network interface 22 is used for receiving aggregated packets $P_{A20}$ transmitted from a communication device S, wherein the aggregated packets $P_{AB}$ are composed of packets $P_{20}$ and $P_A$ respectively destined to the communication device 20 and the communication device A. The reordering engine 26 is used for extracting the packets $P_A$ from the aggregated packets $P_{A20}$, reordering the packets $P_A$, outputting reordered packets $P_{A\_R}$ to the network interface 23, and outputting the packets $P_{20}$ to the reordering engine 27. The network interface 23 transmits the reordered packets $P_{A\_R}$ to the communication device A; if the processing module 21 wants to transmit some packets $P_C$ to a communication device C, the network interface 23 may further aggregate the reordered packets $P_{A\_R}$ and the packets $P_C$ to the commu-nication device A to pass the packets $P_C$. The reordering engine 27 is used for reordering the packets $P_{20}$, and outputting reordered packets $P_{20\_R}$ to the processing module 21 for further processing.

In such a structure, the overhead of processing the packets $P_A$ is transferred to the reordering engine 26, which improves the processing efficiency of the processing module 21 and accelerates passing the packets $P_A$ from the communication device 20 to the communication device A as well. Besides, herein the reordering engine 26 may be viewed as a hardware accelerator for improving a wire speed packet reordering and forward performance to pass the packets to different networks. As a result, the present invention utilizes the reordering engine 26 to offload operating activities of the processing module 21 and reduce a system power consumption of the communication device 20. Noticeably, the network interface may be multiple ports packet switches, e.g. ethernet switches, such that the communication device is capable of transferring packets to multiple interconnected communication devices.

Noticeably, the reordering engine 26 extracting the packets $P_A$ from the aggregated packets $P_{A20}$ leads to that the reordered packets $P_{20\_R}$ outputted by the reordering engine 27 appears "out of order", i.e. the sequence numbers corresponding to each reordered packets $P_{20\_R}$ may not be consecutive integers, such that the reordering engine 27 can not determine whether there is a lost packet being retransmitted. In such a situation, the reordering engine 27 may hold the reordered packets $P_{20\_R}$ and wait for receiving some retransmitted packets to obtain the reordered packets $P_{20\_R}$ with the consecutive sequence numbers, which causes a deadlock or synchronization issue to the communication device 20.

To solve the deadlock issue, the reordering engine 26 further records an expected sequence number $N_{EX}$ corresponding to the aggregated packets $P_{A20}$, and outputs the expected sequence number $N_{EX}$ to the reordering engine 27. The reordering engine 27 reorders the packets $P_{20}$ and then outputs the reordered packets $P_{20\_R}$ to the processing module 21 according to the expected sequence number $N_{EX}$ to be notified whether each of the packets $P_{20}$ is lost or not. If the expected sequence number $N_{EX}$ indicates no packet is lost, the reordering engine 27 outputs the reordered packets $P_{20\_R}$. If the expected sequence number $N_{EX}$ indicates at least one of the packets $P_{20}$ is lost, the reordering engine 27 suspends outputting of the reordered packets $P_{20\_R}$ until the at least one lost packets $P_{20}$ is received. Thus, the processing module 21 may go on performing further processing on the reordered packets $P_{20\_R}$ without the deadlock issue.

Figure 3:
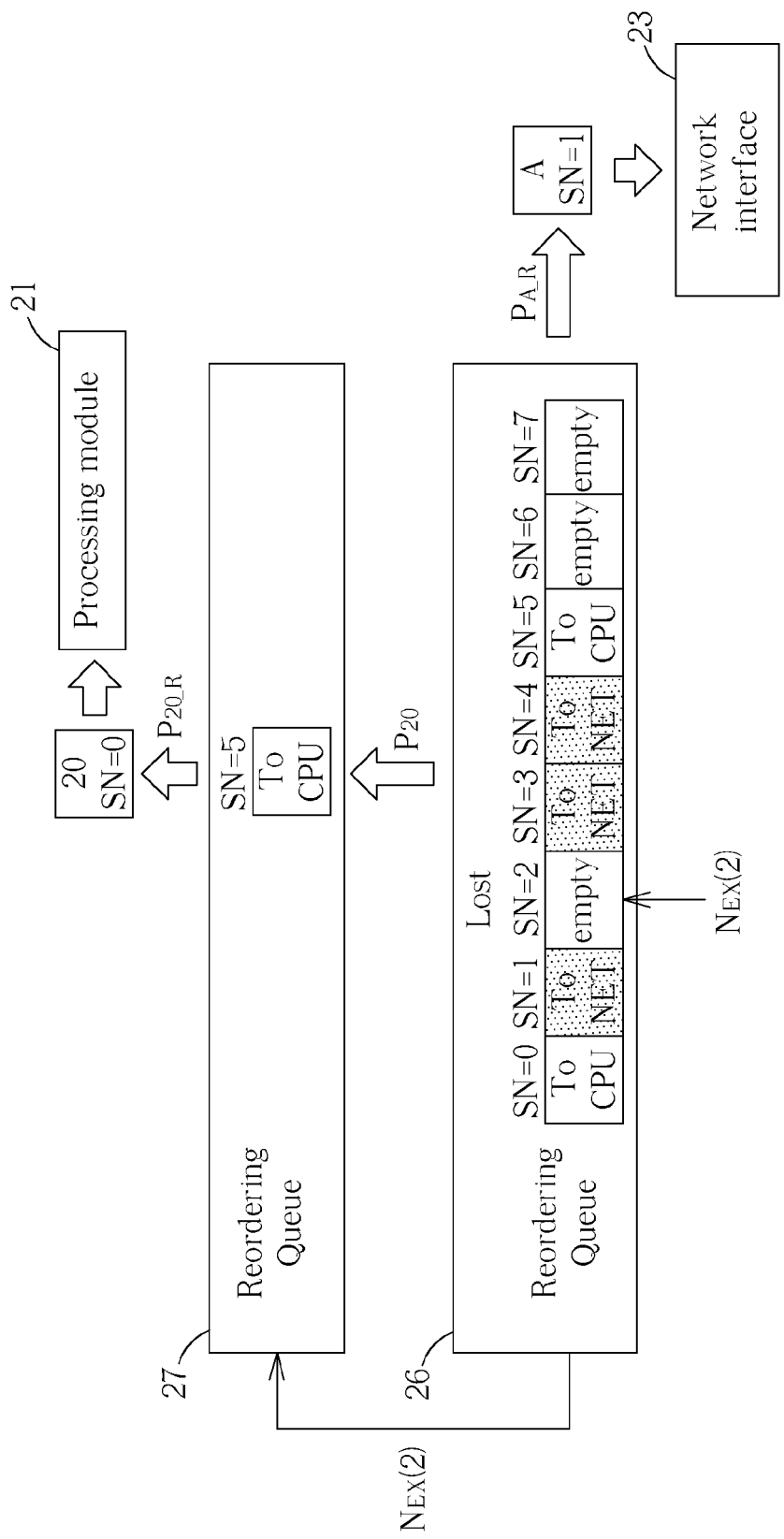
FIG. 3 is a schematic diagram illustrating operation of the reordering engine shown in FIG. 2.

Please refer to FIG. 3, which is a schematic diagram illustrating operation of the reordering engine 26 shown in FIG. 2. The reordering engine 26 stores the aggregated packets $P_{A20}$ into a reordering queue, and records the sequence numbers and destinations of each packet of the aggregated packets $P_{A20}$ to generate the expected sequence number $N_{EX}$. In detail, the destinations of each packet of the packets $P_{A20}$ may be "To CPU", "To NET" or "empty", wherein "To CPU" refers to the packet is sent to the processing module 21, "To NET" refers to the packet is sent to the network interface 23, and "empty" refers to the destination of the packets is unknown, i.e. the packet is not received and could be lost. In addition, if there are packets respectively destined to different networks, the status "To NET" may be "To NET_j", wherein j is a domain name corresponding to different networks. Once the destination "empty" is found, the reordering engine 26 records the expected sequence number $N_{EX}$ to be the sequence number corresponding to the destination "empty" to indicate the packet having the expected sequence number $N_{EX}$ is a lost packet. Then, the reordering engine 26 outputs the expected sequence number $N_{EX}$ to the reordering engine 27 accordingly.

According to the sliding window protocol, the receiver end only feeds back acknowledgment when the packets with continuous sequence numbers are received, and the transmitter end re-transmits the packet when the acknowledgement of the packet is not received during a Round-Trip Time (RTT), i.e. a length of time it takes for a packet to be sent plus a length of time it takes for an acknowledgment of that packet to be received.

As shown in FIG. 3, the reordering engine 26 starts recording the first received packet $P_{20}$(SN=0) and the following $P_A$(SN=1), $P_{20}$(SN=2), $P_A$(SN=3), $P_A$(SN=4) and $P_{20}$(SN=5). Assuming that a packet P(SN=2) is lost, the reordering engine 26 may discover this scenario by recording an arrival of the packet $P_A$(SN=3), $P_A$(SN=4) or $P_{20}$(SN=5) earlier than an arrival of the packet P(SN=2), or the network interface 22 holding transmitting the acknowledgement of the packet P(SN=2). Thus, the reordering engine 26 records the expected sequence number $N_{EX}$ to be $N_{EX}$(2). In such a situation, the reordering engine 26 outputs the packet $P_A$(SN=1) to the network interface 23 since the $P_A$(SN=1) is in order, and holds the packets $P_A$(SN=3) and $P_A$(SN=4) to wait for the arrival of the P(SN=2). Meanwhile, the reordering engine 26 outputs the packets $P_{20}$(SN=0) and $P_{20}$(SN=5) and the expected sequence number $N_{EX}$(2) to the reordering engine 27. The reordering engine 27 outputs the packets $P_{20}$(SN=0) to the processing module 21 since the sequence number of the packet $P_{20}$(SN=0) is less than the expected sequence number $N_{EX}$(2) to determine the packets $P_{20}$(SN=0) is in order. In other words, the packets with the sequence number less than the expected sequence number $N_{EX}$ are well received and acknowledged. The packet $P_{20}$(SN=5) is held in the reordering engine 27 to wait for an update of the expected sequence number $N_{EX}$ to determine whether the packet $P_{20}$(SN=5) can be outputted to the processing module 21 or to be reordered.

Besides, as shown in FIG. 3, above description only discusses one packet is lost, if there are multiple packets lost, the expected sequence number $N_{EX}$ is recorded with the sequence number of the first lost packet, i.e. the lost packet having the smallest sequence number, since the reordering process of the reordering engines 26 and 27 will be held until the arrival of the first lost packet.

When the lost packet $P_{20}$(SN=2) is arrived, the reordering engine 26 updates the expected sequence number $N_{EX}$ to be the sequence number corresponding to the destination "empty", i.e. P(SN=6), and outputs the packet $P_{20}$(SN=2) to the reordering engine 27. Meanwhile, the reordering engine 26 goes on outputting the packets $P_A$(SN=4) and $P_A$(SN=5) to the network interface 23. When the reordering engine 27 receives the packet $P_{20}$(SN=2) and the updated expected sequence number $N_{EX}$(6), the reordering engine 27 is notified that the packets $P_{20}$(SN=2) and $P_{20}$(SN=5) are in order since the expected sequence number $N_{EX}$(6) is greater than the sequence numbers of the packets $P_{20}$(SN=2) and $P_{20}$(SN=5), and thus the reordering engine 27 outputs the reordered packets $P_{20}$(SN=2) and $P_{20}$(SN=5) to the processing module 21 accordingly.

In short, since the reordering process is separated by the reordering engines 26 and 27 to respectively reorder the packets $P_A$ and $P_{20}$, the reordering engine 26 further records the expected sequence number $N_{EX}$ to notify the reordering engine 27 whether to output or hold the reordered packets $P_{20\_R}$ to the processing module 21, such that the reordering processes of the reordering engines 26 and 27 can be synchronized to avoid the deadlock issue.

Figure 4:
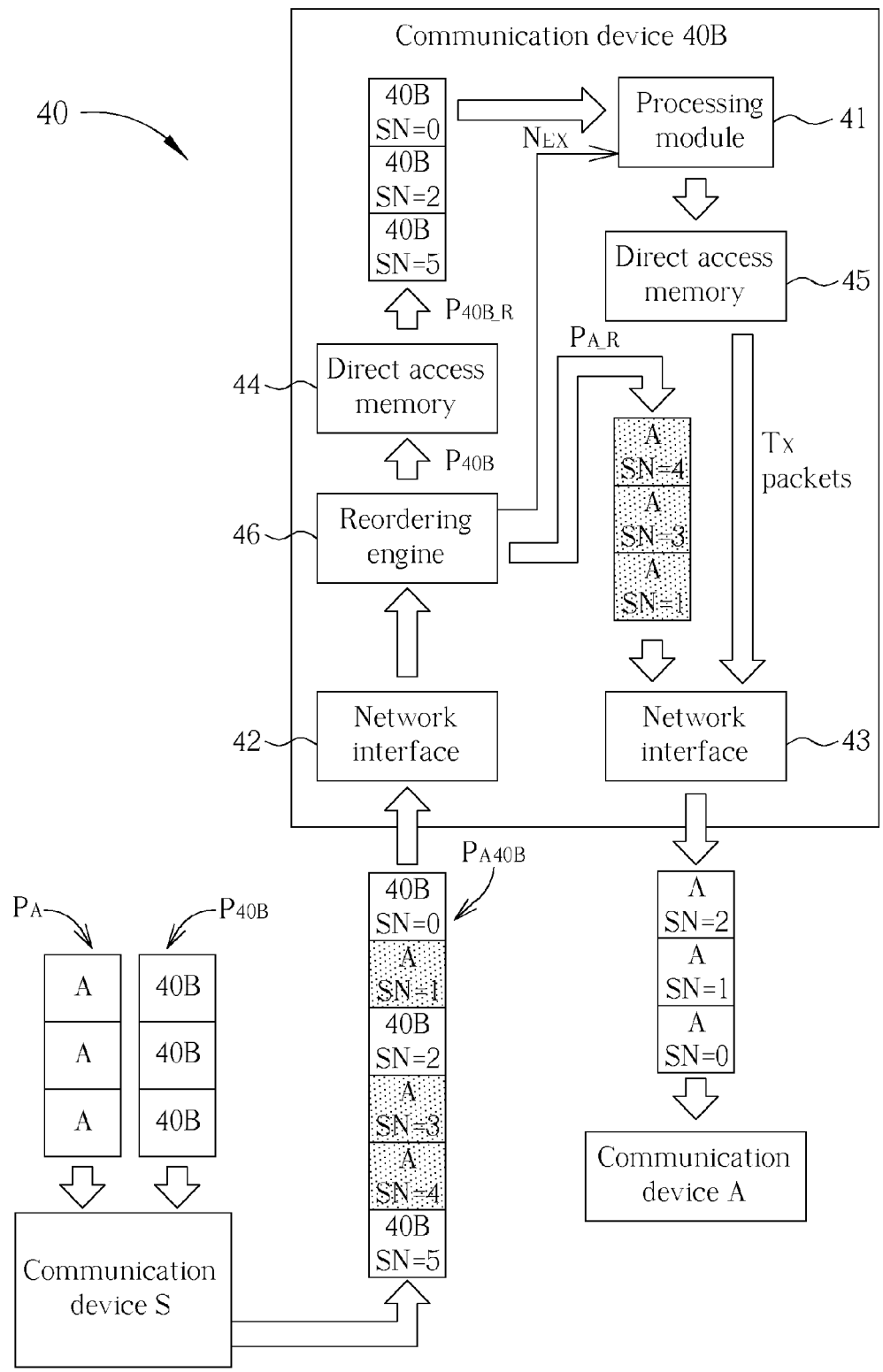
FIG. 4 is a schematic diagram of applying the communication device in FIG. 2 into a communication network according to an embodiment of the present invention.

Specifically, please refer to FIG. 4, which is a schematic diagram of applying the communication device 20 into a communication network 40 according to an embodiment of the present invention. In FIG. 4, a communication device 40B includes only one reordering engine 46 coupled between a network interface 42 and a DMA 44, and the reordering engine 46 has identical functions with the reordering engine 26 as a hardware accelerator for providing a hardware process of reordering the packets $P_A$. The second reordering engine 27 shown in FIG. 2 is included in the processing module 41 for reordering the packets $P_{40B}$ by a software process. Thus, the reordering engine 46 outputs the expected sequence number $N_{EX}$ to the processing module 41 directly. The operations of the processing module 41, the DMAs 44 and 46, the network interfaces 42 and 43 are similar to those of the processing module 21, the DMAs 24 and 26 and the network interfaces 22 and 23, which are omitted herein for simplicity.

Figure 5:
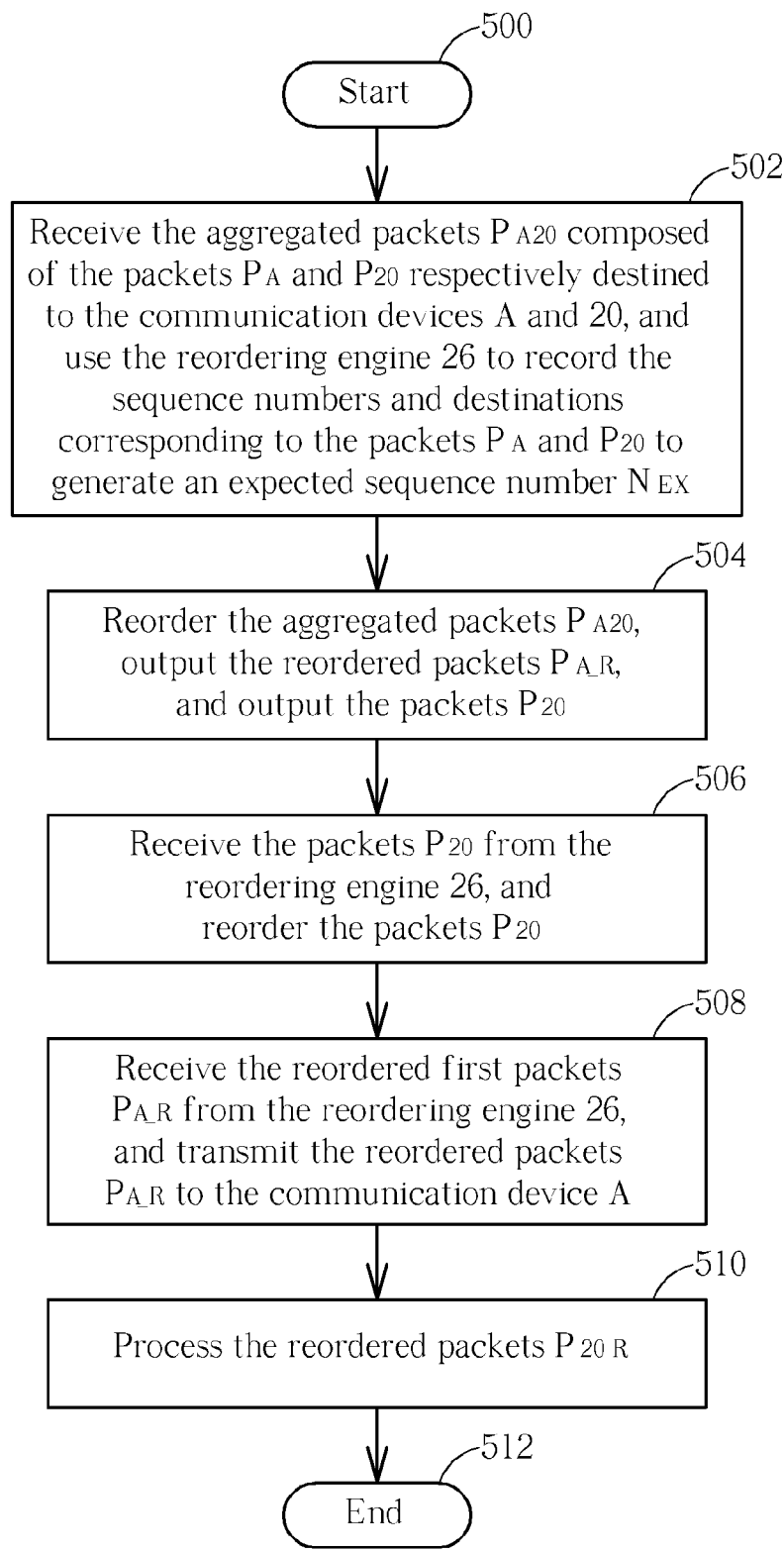
FIG. 5 is a schematic diagram of a packet processing process according to an embodiment of the present invention.

Operations of the communication devices 20 and 40B can be summarized into a packet processing process 50, as shown in FIG. 5. The packet processing process 50 includes the following steps:

Step 500: Start.

Step 502: Receive the aggregated packets $P_{A20}$ composed of the packets $P_A$ and $P_{20}$ respectively destined to the communication devices A and 20, and use the reordering engine 26 to record the sequence numbers and destinations corresponding to the packets $P_A$ and $P_{20}$ to generate an expected sequence number $N_{EX}$.

Step 504: Reorder the aggregated packets $P_{A20}$, output the reordered packets $P_{A\_R}$, and output the packets $P_{20}$.

Step 506: Receive the packets $P_{20}$ from the reordering engine 26, and reorder the packets $P_{20}$.

Step 508: Receive the reordered first packets $P_{A\_R}$ from the reordering engine 26, and transmit the reordered packets $P_{A\_R}$ to the communication device A.

Step 510: Process the reordered packets $P_{20\_R}$.

Step 512: End.

Details of the packet processing process 50 can be derived by referring to the above description.

To sum up, traditionally, operations of processing the aggregated packets are mainly handled by the single processing module, which leads to heavy operating activities and high power consumption of the processing module. The present invention provides a communication device including a reordering engine to offload an overhead of the communication device processing the received packets to improve a processing efficiency of the communication device. In such a structure, the overhead of processing the packets destined to other communication device is transferred to the reordering engine, which improves the processing efficiency of the processing module and accelerates passing the packets to other communication device as well. Besides, the reordering engine of the present invention may be viewed as a hardware accelerator for ensuring a wire speed packet reordering and forward performance to pass the packets to different networks. As a result, the present invention utilizes the reordering engine to offload operating activities of the processing module and reduce a system power consumption of the communication device.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A communication device, comprising:
a first network interface, for receiving a plurality of packets composed of a plurality of first packets destined to a first communication device and a plurality of second packets, wherein a destination of the plurality of second packets is not the first communication device;
a first reordering engine circuit, for extracting the plurality of first packets from the received plurality of packets, reordering the extracted plurality of first packets, outputting the plurality of reordered first packets to a second network interface, and outputting remaining packets in the received plurality of packets to a second reordering engine circuit, wherein the remaining packets comprises the plurality of second packets;
the second reordering engine circuit, for receiving the plurality of second packets from the first reordering engine circuit, and reordering the plurality of second packets;
the second network interface, for receiving the plurality of reordered first packets from the first reordering engine circuit, and transmitting the plurality of reordered first packets to the first communication device; and
a processing circuitry, for processing the plurality of reordered second packets, wherein the first reordering engine circuit is arranged at outside of the processing circuitry.

2. The communication device of claim 1, wherein the first reordering engine circuit reorders the plurality of first packets through hardware processing.

3. The communication device of claim 1, wherein the second reordering engine circuit reorders the plurality of second packets through software processing.

4. A communication device, comprising:
a first network interface, for receiving a plurality of packets composed of a plurality of first packets destined to a first communication device and a plurality of second packets destined to the communication device;
a first reordering engine circuit, for extracting the plurality of first packets from the received plurality of packets, reordering the extracted plurality of first packets, outputting the plurality of reordered first packets to a second network interface, and outputting the plurality of second packets to a second reordering engine circuit; and recording the sequence numbers and destinations corresponding to each of the received plurality of packets to generate an expected sequence number, and outputting the expected sequence number to the second reordering engine circuit, wherein the plurality of first packets and the plurality of second packets share the same sequence number domain, and the expected sequence number is for indicating the corresponding packet having the expected sequence number is not received;
the second reordering engine circuit, for receiving the plurality of second packets, and reordering the plurality of second packets according to the expected sequence number;
the second network interface, for receiving the plurality of reordered first packets, and transmitting the plurality of reordered first packets to the first communication device; and
a processing circuitry, for processing the plurality of reordered second packets.

5. The communication device of claim 4, wherein the expected sequence number is the smallest sequence number in sequence numbers of the multiple packets which are not received.

6. The communication device of claim 4, wherein the second reordering engine circuit holds the plurality of second packets when the expected sequence number indicates that at least one of the plurality of second packets is lost.

7. A packet processing method for a communication device, comprising:
receiving a plurality of packets composed of a plurality of first packets destined to a first communication device and a plurality of second packets, wherein a destination of the plurality of second packets is not the first communication device;
extracting the plurality of first packets from the received plurality of packets, reordering the plurality of first packets, outputting the plurality of reordered first packets to a network interface, and outputting the plurality of second packets, wherein the steps of extracting, reordering and outputting are performed by a first reordering engine circuit;
receiving the plurality of second packets from the first reordering engine circuit, and reordering the plurality of second packets by a second reordering engine circuit;
receiving the plurality of reordered first packets from the first reordering engine circuit, and transmitting the plurality of reordered first packets to the first communication device, wherein the steps of receiving and transmitting the plurality of reordered first packets are performed by the network interface, and the first reordering engine circuit, the second reordering engine circuit and the network interface are arranged in the communication device; and
processing the plurality of reordered second packets.

8. The packet reordering method of claim 7, wherein the first reordering engine circuit reordering the plurality of first packets destined to the first communication device through hardware processing.

9. The packet reordering method of claim 7, wherein the second reordering engine circuit reordering the plurality of second packets through software processing.

10. The packet reordering method of claim 7, further comprising the first reordering engine circuit recording the sequence numbers and destinations corresponding to each of the plurality of packets to generate an expected sequence number, wherein the plurality of first packets and the plurality of second packets share the same sequence number domain, and the expected sequence number is for indicating the corresponding packet having the expected sequence number is not received.

11. The packet reordering method of claim 10, wherein the expected sequence number is the smallest sequence number in sequence numbers of the multiple packets which are not received.

12. The packet reordering method of claim 10, the second reordering engine circuit reordering the plurality of packets according to the expected sequence number.

13. The packet reordering method of claim 12, wherein the second reordering engine circuit reordering the plurality of second packets according to the expected sequence number comprises the second reordering engine circuit holding the plurality of second packets when the expected sequence number indicates that at least one of the plurality of second packets is lost.

14. A communication device, comprising:

a first network interface, for receiving a plurality of packets composed of a plurality of first packets destined to a first communication device and a plurality of second packets, wherein a destination of the plurality of second packets is not the first communication device;

a first reordering engine circuit, for extracting the plurality of first packets from the received plurality of packets, reordering the extracted plurality of first packets, outputting the plurality of reordered first packets to a second network interface, and outputting remaining packets in the received plurality of packets to a processing circuitry, wherein the remaining packets comprises the plurality of second packets;

the second network interface, for receiving the plurality of reordered first packets from the first reordering engine circuit, and transmitting the plurality of reordered first packets to the first communication device; and the processing circuitry, for receiving the plurality of second packets from the first reordering engine circuit, and processing the plurality of reordered second packets, wherein the first reordering engine circuit is arranged at outside of the processing circuitry.

15. The communication device of claim 14, wherein the first reordering engine circuit reorders the plurality of first packets through hardware processing.

16. A communication device, comprising:

a first network interface, for receiving a plurality of packets composed of a plurality of first packets destined to a first communication device and a plurality of second packets destined to the communication device;

a first reordering engine circuit, for extracting the plurality of first packets from the received plurality of packets, reordering the extracted plurality of first packets, outputting the plurality of reordered first packets to a second network interface, and outputting the plurality of second packets to a processing circuitry; and recording the sequence numbers and destinations corresponding to each of the received plurality of packets to generate an expected sequence number, and outputting the expected sequence number to the processing circuitry, wherein the plurality of first packets and the plurality of second packets share the same sequence number domain, and the expected sequence number is for indicating the corresponding packet having the expected sequence number is not received;

the second network interface, for receiving the plurality of reordered first packets, and transmitting the plurality of reordered first packets to the first communication device; and the processing circuitry, for receiving the plurality of second packets, and reordering the plurality of second packets according to the expected sequence number, and processing the plurality of reordered second packets.

17. The communication device of claim 16, wherein the expected sequence number is the smallest sequence number in sequence numbers of the multiple packets which are not received.

18. The communication device of claim 16, wherein the processing circuitry holds the plurality of second packets when the expected sequence number indicates that at least one of the plurality of second packets is lost.

\* \* \* \* \*